(12) United States Patent
Garg et al.

(10) Patent No.: US 12,553,942 B2
(45) Date of Patent: Feb. 17, 2026

(54) TEST FOR SOURCE SYNCHRONOUS INTERFACES

(71) Applicant: NXP B.V., Eindhoven (NL)

(72) Inventors: Akhil Garg, Greater Noida (IN); Sahil Jain, Ghaziabad (IN); Abhishek Mahajan, Noida (IN); Amit Jindal, Sonipat (IN)

(73) Assignee: NXP B.V., Eindhovent (NL)

( * ) Notice: Subject to any disclaimer, the term of this patent is extended or adjusted under 35 U.S.C. 154(b) by 438 days.

(21) Appl. No.: 18/168,643

(22) Filed: Feb. 14, 2023

(65) Prior Publication Data

US 2024/0192271 A1 Jun. 13, 2024

(30) Foreign Application Priority Data

Dec. 13, 2022 (IN) .............................. 202221071952

(51) Int. Cl.
*G01R 31/317* (2006.01)
*G01R 31/3185* (2006.01)

(52) U.S. Cl.
CPC . *G01R 31/31704* (2013.01); *G01R 31/31727* (2013.01); *G01R 31/318541* (2013.01)

(58) Field of Classification Search
CPC ........ G01R 31/31704; G01R 31/31727; G01R 31/318541

USPC ......... 713/400; 714/727, 726, 729, 731, 744
See application file for complete search history.

(56) References Cited

U.S. PATENT DOCUMENTS

| | | | |
|---|---|---|---|
| 9,234,942 B2 | 1/2016 | Banerjee et al. | |
| 10,444,280 B2 * | 10/2019 | Jayaraman | G06F 11/00 |
| 11,934,219 B2 * | 3/2024 | Jain | G01R 31/31727 |
| 2013/0218508 A1 | 8/2013 | Jindal | |
| 2014/0088912 A1 * | 3/2014 | Banerjee | G01R 31/318594 702/120 |
| 2016/0169971 A1 | 6/2016 | Oomman et al. | |
| 2017/0149555 A1 | 5/2017 | Cohen et al. | |
| 2019/0096503 A1 * | 3/2019 | Chakravarty | H01L 23/5384 |

FOREIGN PATENT DOCUMENTS

EP 1873540 B1 11/2009

* cited by examiner

*Primary Examiner* — Brian T Misiura

(57) ABSTRACT

A method for Design For Test (DFT) for Source Synchronous Interfaces (SSI) includes shifting a test vector into a master register slice with a DFT clock. A functional clock is generated. The test vector and the functional clock are launched from a first SSI of the master register slice. The test vector and the functional clock are captured with a second SSI of a slave. The test vector is shifted out of the slave with the DFT clock.

17 Claims, 5 Drawing Sheets

TEST FOR SOURCE SYNCHRONOUS INTERFACES

BACKGROUND

Field of the Disclosure

This disclosure relates generally to Design For Test (DFT), and more specifically to a hierarchical DFT scheme for Source Synchronous Interfaces (SSI).

Background

Large Systems On a Chip (SOC) may contain numerous communication interfaces between the various subsystems. Higher bandwidth is achieved by using SSI between these subsystems. SSI improves bandwidth by transferring a clock and data together, so that the clock and data will be equally delayed, with a limitation that the skew between the clock and data must be less than half of the clock period. A traditional "two clock cycle at-speed" test uses a clock edge of one cycle of a local Phase Locked Loop (PLL) to launch data, and the same edge of a subsequent cycle to capture the data, however this test approach is not applicable for SSI interfaces. SSI interfaces have traditionally been tested with a slower DFT clock generator used to scan data into and out of scan chains and also to propagate the data. Accordingly, very low at-speed test coverage has been obtained with this approach.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF EMBODIMENTS

Embodiments described herein provide for hierarchical at-speed testing of SOCs having SSI interfaces. A combination of slower DFT clocks are used for serialized transfer of test vectors and higher speed functional clocking is used between registers. Accordingly, high fault coverage is realized, while still maintaining the IEEE 1500 standards support for inter subsystem tests. IEEE 1500 is a standard for embedded core testing supported by the Institute of Electrical and Electronics Engineers (IEEE) association.

Figure 1:
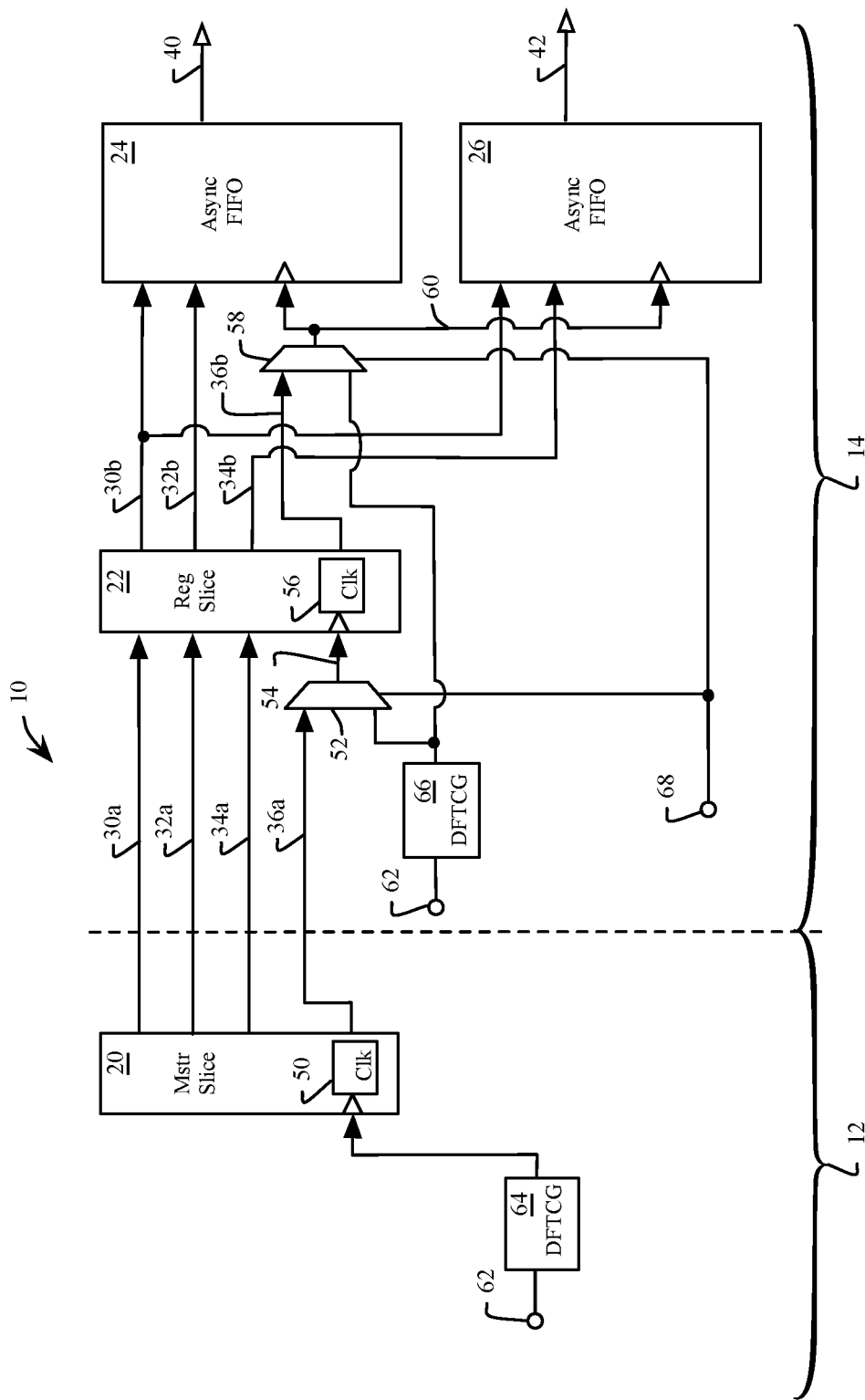
FIG. 1 is a schematic view of an example of a System On a Chip (SOC) with a DFT scheme based on a global clock.

FIG. 1 shows an example of an SOC 10 with a traditional DFT scheme based on a common clock used to load, propagate and unload test data. The SOC 10 includes a first subsystem 12 and a second subsystem 14. The first subsystem 12 includes a master register slice 20. The second subsystem 14 includes a register slice 22, an asynchronous First In First Out (FIFO) 24 and an asynchronous FIFO 26. The master register slice 20 transmits to the register slice 22, a data ("Data") 30a, a write enable for read data ("Wren_r") 32a, a write enable for address data (Wren_ar") 34a and a clock 36a, each of which are subsequently retransmitted to both asynchronous FIFOs 24 and 26 as 30b, 32b, 34 and 36b respectively. The asynchronous FIFOs 24 and 26 provide outputs 40 and 42 respectively. A clock generator 50 generates the clock 36a. A multiplexer 52 receives the clock 36a and may selectively generate an output 54, which triggers a clock generator 56 of the register slice 22 to provide the clock 36b. A multiplexer 58 receives the clock 36b and may selectively generate an output 60, which clocks each of the asynchronous FIFOs 24 and 26. During a test mode, a test clock 62 is gated by Design For Test Clock Gating (DFTCG) circuits 64 and 66. A scan mode signal 68, controls the multiplexers 54 and 58 to select either the clocks 36a and 36b respectively, or the gated test clocks of DFTCG 64 and 66 respectively. When the SOC 10 is being tested, the functional clocks 36a and 36b are not selected. Instead, the gated test clocks from the DFTCG circuits 64 and 66 are used to scan test data into the master slice 20, to propagate the data from the master slice to the register slice 22 and asynchronous FIFOs 24 and 26, and to scan test data out of the SOC 10. The gated clocks from the DFTCG circuits 64 and 66 do not test for transition delay (TD) faults that occur when propagation occurs through the register slice 22 without gating.

Figure 2:
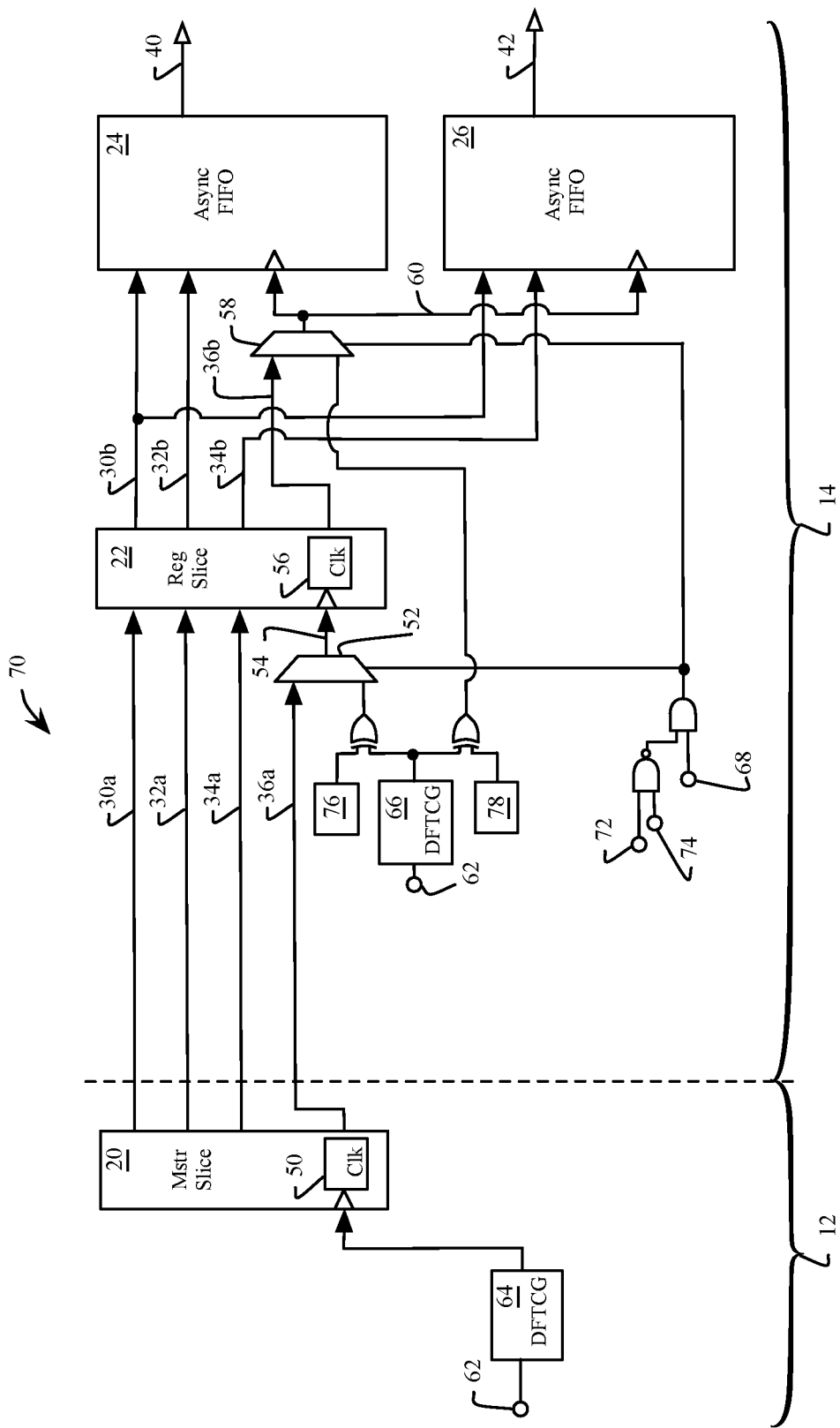
FIG. 2 is a schematic view of an SOC with a hierarchical DFT scheme, in accordance with an embodiment of the present disclosure.

FIG. 2 shows an SOC 70 including the hierarchical DFT scheme, in accordance with an embodiment of the present disclosure. An ExTest signal 72 and a DFT control signal 74 (used to select between a shift and capture phase) are further used to gate the scan mode signal 68. Specifically, when the ExTest signal 72 and the DFT control signal 74 are asserted high (e.g., a logical "1" value), the multiplexers 52 and 58 will allow the clock signals 36a and 36b to pass through to the multiplexer outputs 54 and 60 respectively. Otherwise, the multiplexers 52 and 58 will pass the clock signal 62 through to the multiplexer outputs 54 and 60. In another embodiment, gating the scan mode signal 68 may be conditioned upon one or more signals. During test of the SOC 70, the test clock 62 is used to scan test data into an SSI interface of the master register slice 20. The test data is then launched from the master slice 20 along with a functional clock 36a generated by the clock generator 50 and allowed to propagate to the register slice and subsequently to the asynchronous FIFOs 24 and 26.

The test data is thus propagated "at-speed" concurrently with the functional clocks 36a and 36b. After the test data is captured by a combination of the register slice 22 and the asynchronous FIFOs 24 and 26, the test data may be scanned out. In one embodiment, one or more of the register slice 22 and the asynchronous FIFOs 24 are 26 are referred to as "slaves." Accordingly, the test scheme of FIG. 2 provides true at-speed (e.g., the speed at which the SOC 70 normally operates during normal usage). Furthermore this test scheme is agnostic to the number of intervening register slices between the master register slice 20 and the slaves. An SSI interface requires the functional clock 36a to be delayed by approximately 180 degrees relative to the data 30a that it will register (e.g., to provide a good "data eye"). Depending upon the number of registers between the master register slice 20 and the slave, there may be more than one inversion. To ensure that the clock polarity of the functional clock 36a or 36b is the same as the test clock gated by DFTCG 66, each functional clock 36a or 36b may be selectively inverted depending on a corresponding Test Data Register (TDR) bit 76 or 78. In one embodiment, the inversion of the functional clocks 36a, 36b or both 36a and 36b is performed by an "exclusive-OR" logic gate.

Figure 3:
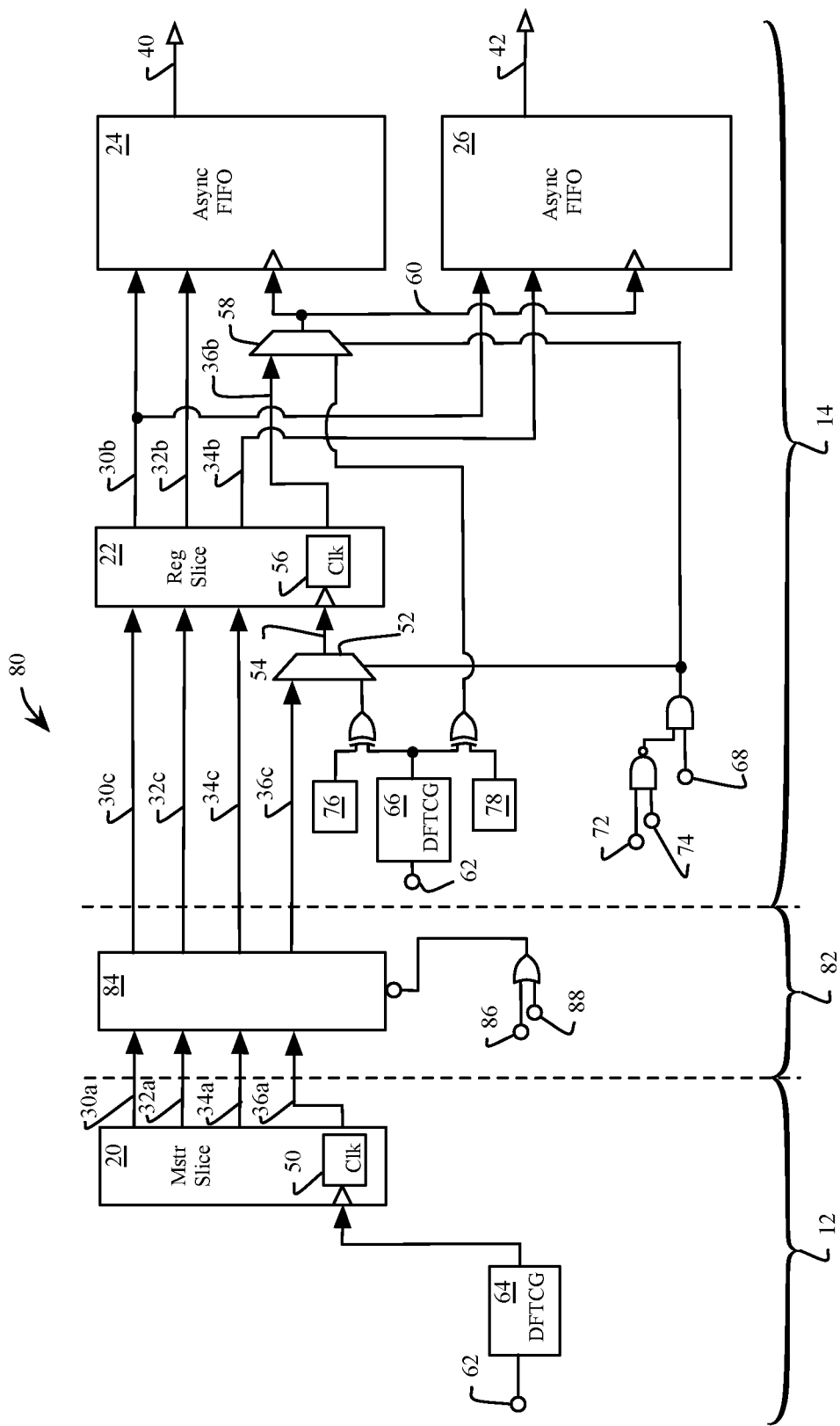
FIG. 3 is a schematic view of an SOC with a hierarchical DFT scheme, in accordance with another embodiment of the present disclosure.

FIG. 3 with continued reference to FIG. 2 shows an SOC 80 including the hierarchical DFT scheme, in accordance with another embodiment of the present disclosure. The SOC 80 includes a third subsystem 82 interposed between the first subsystem 12 and the second subsystem 14. The third subsystem 82 includes an intermediate register 84, which in one example, may be conditionally reset based on the state of a functional reset signal 86 and a scan enable signal 88. In another embodiment, the reset of the intermediate register 84 may be conditioned upon one or more signals. Similar to the register slice 22, the intermediate register 84 retransmits a data signal 30c, a write enable for read data 32c, a write enable for address data 34c and a clock 36c.

In contrast to the register slice 22, (e.g. a slave), the intermediate register 84 has no scan elements and relies exclusively on the functional clock 36a to propagate the data and functional clock 36a from the first subsystem 12, (which includes the master) to the final subsystem 14, (which includes the slave). Specifically, test data (e.g., a "test vector") is scanned into a register of the first subsystem 12, propagated through intermediate registers (e.g., subsystem 82), at-speed and without scan by launching the test vector from an SSI of the master. The test data is then captured by the last (e.g., second) subsystem 14 having the slave and scanned out. In various embodiments, the slave may be one or more of the register slice 22, and the asynchronous FIFOs 24 and 26, each included in the last (e.g., third) subsystem 14.

In one embodiment, the intermediate register 84 is instantiated at a top hierarchical level of the SOC 80 and assists in retiming communications between the subsystems 12 and 14. Testing the intermediate register with the functional clock may improve the fault coverage over the traditional "two clock cycle" test, the later allowing for extra settling time resulting from transistors that may be abnormally slow to transition between states.

Figure 4:
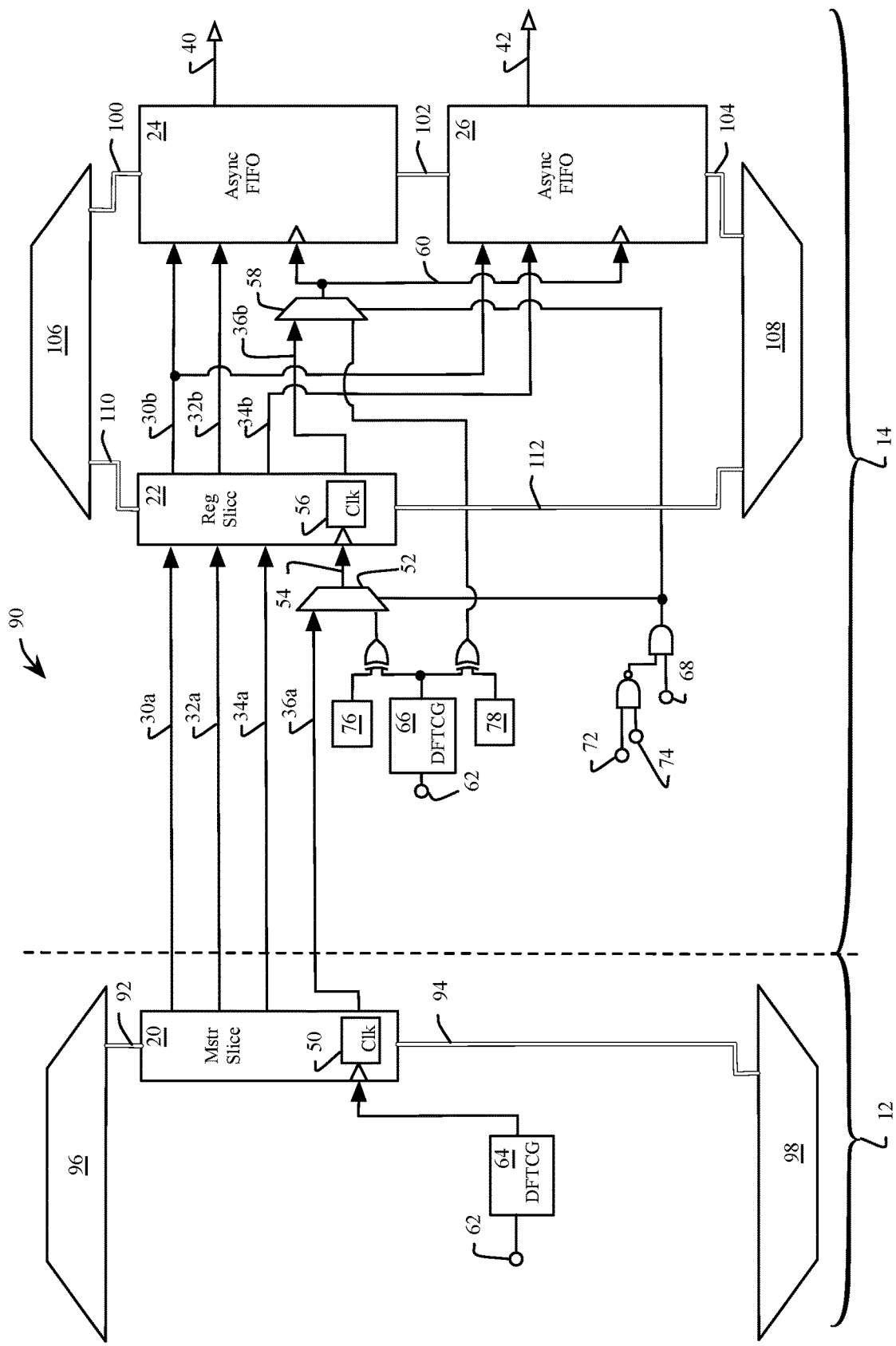
FIG. 4 is a schematic view of an SOC with a DFT scheme including scan chain wrappers, in accordance with an embodiment of the present disclosure.

FIG. 4 shows an SOC 90 including scan chain wrappers, in accordance with an embodiment of the present disclosure. The SOC 90 includes scan chains 92 and 94 to scan test data into the master register slice 20 from respective scan wrappers 96 and 98. The SOC 90 further includes scan chains 100 and 104 to scan test data out of the asynchronous FIFOs 24 and 26 and into respective scan wrappers 106 and 108, and scan chain 102 to scan data between the asynchronous FIFOs 24 and 26. The SOC 90 further includes scan chains 110 and 112 to scan test data out of the register slice 22 and into respective scan wrappers 106 and 108.

In one embodiment, each of the scan wrappers 96, 98, 106 and 108 may convert scan data from a higher hierarchical level of the SOC 90 to a serialized format appropriate for interfacing with the master slice 20, register slice 22 and asynchronous FIFOs 24 and 26. The higher hierarchical level of the SOC 90 may stitch scan chains together to form one or more concatenated chains. Each register slice or FIFO of the SOC 90 forming a master or a slave may have a unique scan chain due to the requirement for configurable clock polarities as described in FIG. 2. When stitching scan chains together, "lockups" may be inserted between the scan chains of the register slices and FIFOs to reduce the timing skew between the scan chains forming the concatenated scan chain. The term "lockup" as used throughout this disclosure refers to a transparent latch circuit used to resolve a clock skew problem by introducing a half cycle delay in the data path.

Figure 5:
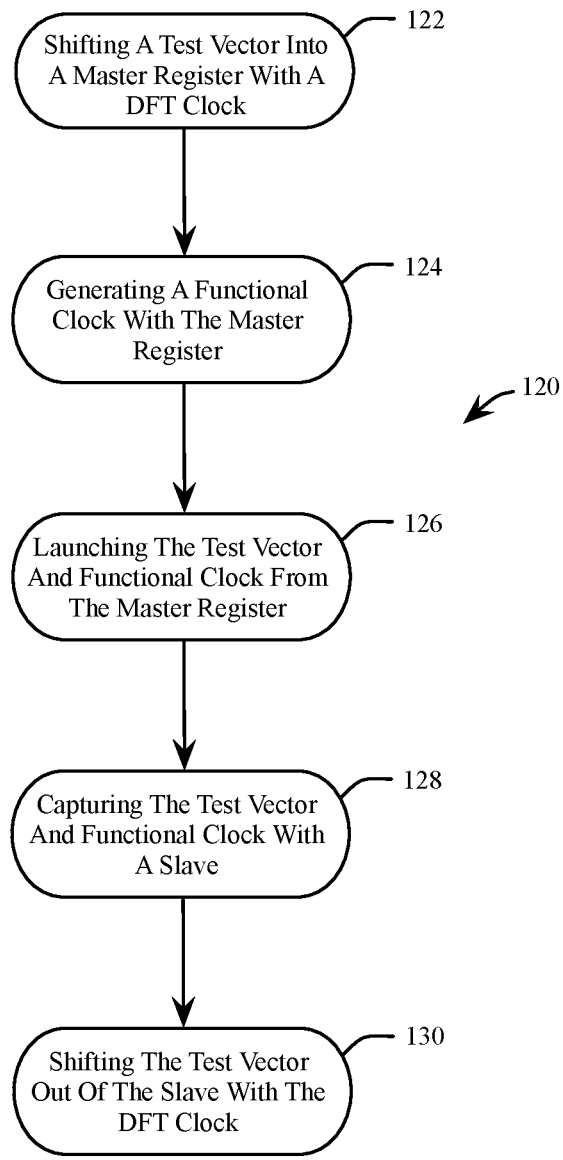
FIG. 5 is a flowchart representation of a method for DFT for an SOC having an SSI, in accordance with an embodiment of the present disclosure.

FIG. 5 shows an embodiment 120 of a method for DFT for SSI interfaces. With continued reference to FIG. 4, at 122, a test vector may be shifted into a master register slice 20 of the first subsystem 12 with a DFT clock 62. The test vector is shifted into the master register slice 20 from the scan wrappers 96 and 98 through the scan chains 92 and 94 respectively. At 124, a functional clock 36a is generated with the master register slice 20 (by the clock generator 50). At 126, the test vector and functional clock 36a is launched from the master register slice 20 from the SSI interface. At 128, the test vector and functional clock 36a are captured with a slave (e.g., one or more of the register slice 22 and the asynchronous FIFOs 24 and 26 of the second subsystem 14. At 130, a test vector is shifted out of a slave of the second subsystem 14 with the DFT clock 62.

For example, the test vector may be shifted out of the register slice 22 to the scan wrappers 106 and 108 through the scan chains 110 and 112 respectively. In another example, the test vector may be shifted out of the asynchronous FIFOs 24 and 26 to the scan wrappers 106 and 108 through the scan chains 100 and 104 respectively. In another example, the test vector may be shifted out of a combination of the register slice 22 and the asynchronous FIFOs 24 and 26.

As will be appreciated, at least some of the embodiments as disclosed include at least the following. In one embodiment, a method for Design For Test (DFT) for Source Synchronous Interfaces (SSI) comprises shifting a test vector into a master register slice with a DFT clock. A functional clock is generated. The test vector and the functional clock are launched from a first SSI of the master register slice. The test vector and the functional clock are captured with a second SSI of a slave. The test vector is shifted out of the slave with the DFT clock.

Alternative embodiments of the method for Design For Test (DFT) for Source Synchronous Interfaces (SSI) include one of the following features, or any combination thereof. A clock input of the slave is selected with a multiplexer, wherein the multiplexer is configured to select one of the functional clock and the DFT clock. The DFT clock is selectably inverted to align a first polarity of the functional clock to a second polarity of the DFT clock. A first frequency of the functional clock is greater than a second frequency of the DFT clock. The test vector and the functional clock are propagated through an intermediate register slice prior to capturing the test vector and the functional clock with the second SSI of the slave, wherein the intermediate register slice is clocked only with the functional clock. Shifting the test vector out of the slave comprises shifting a respective data from one or more of a slave register slice and an asynchronous First In First Out (FIFO) register. A first scan chain from a slave register slice is concatenated with a second scan chain from an asynchronous First In First Out (FIFO) register, wherein the slave comprises the slave register slice and the asynchronous FIFO register. A timing skew between the first scan chain and the second scan chain is resolved with a lockup latch. A first subsystem comprises shifting the test vector in with the DFT clock, and a second subsystem comprises shifting a second test vector out with a second DFT clock. A functional behavior of the first subsystem is emulated with the test vector.

In another embodiment, an apparatus comprises a master register slice comprising a first Source Synchronous Interface (SSI). A slave comprises a second SSI, wherein the second SSI is configured to receive a test vector and a functional clock from the first SSI during a capture mode. A multiplexer is connected to the functional clock, a Design For Test (DFT) clock and a clock input of the slave, wherein the multiplexer is configured to select the DFT clock in response to a request to shift out the test vector from the slave and to select the functional clock during the capture mode.

Alternative embodiments of the apparatus include one of the following features, or any combination thereof. A selectable inverter is between the DFT clock and the multiplexer, the selective inverter is configured to invert the DFT clock to align a first polarity of the functional clock to a second polarity of the DFT clock. A first frequency of the functional clock is greater than a second frequency of the DFT clock. The test vector and the functional clock propagate through an intermediate register slice prior to being captured with the second SSI of the slave, and the intermediate register slice is clocked only with the functional clock. The slave comprises one or more of a slave register slice and an asynchronous First In First Out (FIFO) register.

In another embodiment, an apparatus comprises a first subsystem comprising a first register comprising a first Source Synchronous Interface (SSI). A second subsystem comprises a second register comprising a second SSI, wherein the second SSI is configured to receive a test vector and a functional clock from the first SSI during a capture mode. A multiplexer is connected to the functional clock, a Design For Test (DFT) clock and a clock input of the second register, wherein the multiplexer is configured to select the DFT clock in response to a request to shift out the test vector from the second register and to select the functional clock during the capture mode.

Alternative embodiments of the apparatus include one of the following features, or any combination thereof. An intermediate register is interposed between the first register and the second register, wherein the test vector and the functional clock propagate through the intermediate register prior to being captured with the second SSI, and the intermediate register is clocked only with the functional clock. The second subsystem further comprises an asynchronous First In First Out (FIFO) register, wherein the second register comprises a first scan chain and the FIFO comprises a second scan chain. A lockup latch is configured to resolve a timing skew between the first scan chain and the second scan chain. The first subsystem comprises a second DFT clock, configured to scan the test vector into the first register.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

We claim:

1. A method for Design For Test (DFT) for Source Synchronous Interfaces (SSI) comprising:
    shifting a test vector into a master register slice with a DFT clock;
    generating a functional clock;
    launching the test vector and the functional clock from a first SSI of the master register slice;
    capturing the test vector and the functional clock with a second SSI of a slave;
    shifting the test vector out of the slave with the DFT clock; and propagating the test vector and the functional clock through an intermediate register slice prior to capturing the test vector and the functional clock with the second SSI of the slave, wherein the intermediate register slice is clocked only with the functional clock.

2. The method of claim 1 further comprising selecting a clock input of the slave with a multiplexer, wherein the multiplexer is configured to select one of the functional clock and the DFT clock.

3. The method of claim 2 further comprising selectably inverting the DFT clock to align a first polarity of the functional clock to a second polarity of the DFT clock.

4. The method of claim 1 wherein a first frequency of the functional clock is greater than a second frequency of the DFT clock.

5. The method of claim 1 wherein shifting the test vector out of the slave comprises shifting a respective data from one or more of a slave register slice and an asynchronous First In First Out (FIFO) register.

6. The method of claim 1 further comprising concatenating a first scan chain from a slave register slice with a second scan chain from an asynchronous First In First Out (FIFO) register, wherein the slave comprises the slave register slice and the asynchronous FIFO register.

7. The method of claim 6 further comprising resolving a timing skew between the first scan chain and the second scan chain with a lockup latch.

8. The method of claim 1 wherein a first subsystem comprises shifting the test vector in with the DFT clock, and a second subsystem comprises shifting a second test vector out with a second DFT clock.

9. The method of claim 8 further comprising emulating a functional behavior of the first subsystem with the test vector.

10. An apparatus comprising:
    a master register slice comprising a first Source Synchronous Interface (SSI);
    a slave comprising a second SSI, wherein the second SSI is configured to receive a test vector and a functional clock from the first SSI during a capture mode; and
    a multiplexer connected to the functional clock, a Design For Test (DFT) clock and a clock input of the slave, wherein the multiplexer is configured to select the DFT clock in response to a request to shift out the test vector from the slave and to select the functional clock during the capture mode; wherein the test vector and the functional clock propagate through an intermediate register slice prior to being captured with the second SSI of the slave, and the intermediate register slice is clocked only with the functional clock.

11. The apparatus of claim 10 further comprising a selectable inverter between the DFT clock and the multiplexer, the selective inverter configured to invert the DFT clock to align a first polarity of the functional clock to a second polarity of the DFT clock.

12. The apparatus of claim 10 wherein a first frequency of the functional clock is greater than a second frequency of the DFT clock.

13. The apparatus of claim 10 wherein the slave comprises one or more of a slave register slice and an asynchronous First In First Out (FIFO) register.

14. An apparatus comprising:
a first subsystem comprising a first register comprising a first Source Synchronous Interface (SSI);
a second subsystem comprising a second register comprising a second SSI,
wherein the second SSI is configured to receive a test vector and a functional clock from the first SSI during a capture mode;
a multiplexer connected to the functional clock, a Design For Test (DFT) clock and a clock input of the second register, wherein the multiplexer is configured to select the DFT clock in response to a request to shift out the test vector from the second register and to select the functional clock during the capture mode; and
an intermediate register interposed between the first register and the second register, wherein the test vector and the functional clock propagate through the intermediate register prior to being captured with the second SSI, and the intermediate register is clocked only with the functional clock.

15. The apparatus of claim 14 wherein the second subsystem further comprises an asynchronous First In First Out (FIFO) register, wherein the second register comprises a first scan chain and the FIFO comprises a second scan chain.

16. The apparatus of claim 15 further comprising a lockup latch configured to resolve a timing skew between the first scan chain and the second scan chain.

17. The apparatus of claim 14 wherein the first subsystem comprises a second DFT clock, configured to scan the test vector into the first register.

* * * * *